United States Patent
Moritani

(10) Patent No.: US 7,772,305 B2
(45) Date of Patent: Aug. 10, 2010

(54) HYDROGENATED NBR COMPOSITION

(75) Inventor: Yoichi Moritani, Kanagawa (JP)

(73) Assignee: NOK Corporation, Tokyo (JP)

( * ) Notice: Subject to any disclaimer, the term of this patent is extended or adjusted under 35 U.S.C. 154(b) by 0 days.

(21) Appl. No.: 12/224,113

(22) PCT Filed: Jan. 26, 2007

(86) PCT No.: PCT/JP2007/051236

§ 371 (c)(1),
(2), (4) Date: Aug. 18, 2008

(87) PCT Pub. No.: WO2007/094158

PCT Pub. Date: Aug. 23, 2007

(65) Prior Publication Data

US 2009/0062445 A1    Mar. 5, 2009

(30) Foreign Application Priority Data

Feb. 17, 2006    (JP)    ............................. 2006-040274

(51) Int. Cl.
*C08L 9/02*    (2006.01)
*C08L 33/18*    (2006.01)

(52) U.S. Cl. ..................... 524/284; 524/315; 524/521; 524/535; 525/274; 525/517

(58) Field of Classification Search ................ 524/284, 524/315, 521, 535; 525/274, 517
See application file for complete search history.

(56) References Cited

FOREIGN PATENT DOCUMENTS

| JP | 09-003246 | * | 1/1997 |
|---|---|---|---|
| JP | 11-286576 | * | 10/1999 |
| JP | 2000-212333 | | 8/2000 |
| JP | 2001-288303 | | 10/2001 |
| JP | 2002-080639 | * | 3/2002 |
| JP | 2003342422 | | 3/2003 |
| JP | 2003-342422 | * | 12/2003 |
| JP | 2004-099753 | | 4/2004 |
| JP | 2004-217811 | | 8/2004 |
| JP | 2005-285537 | | 10/2005 |

OTHER PUBLICATIONS

Supplementary European Search Report from corresponding PCT application No. PCT/JP2007/051236.

* cited by examiner

*Primary Examiner*—Robert D. Harlan
(74) *Attorney, Agent, or Firm*—Brinks Hofer Gilson & Lione

(57) ABSTRACT

A hydrogenated NBR composition, which comprises 100 parts by weight of a hydrogenated NBR having an acrylonitrile content of 25-44% by weight and an iodine number of 32-65, or a blend of the hydrogenated NBRs themselves, 2-23 parts by weight of an ester-based plasticizer, and 0.5-10 parts by weight of an organic peroxide, and preferably further contains 0.5-10 parts by weight of a polyfunctional unsaturated compound, can give molding products having distinguished oil resistance and fuel oil resistance as well as distinguished heat resistance and cold resistance, and thus can be used as suitable molding materials for intake manifold gaskets of automobile engines.

15 Claims, No Drawings

HYDROGENATED NBR COMPOSITION

RELATED APPLICATIONS

The present application is a 35 U.S.C. §371 national stage filing of International Patent Application No. PCT/JP2007/051236, filed Jan. 26, 2007, to which priority is claimed under 35 U.S.C. §120 and through which priority is claimed under 35 U.S.C. §119 to Japanese Priority Patent Application No. 2006-040274, filed Feb. 17, 2006.

TECHNICAL FIELD

The present invention relates to a hydrogenated NBR composition, and more particularly to a hydrogenated NBR composition for use as suitable molding materials for automobile engine parts such as intake manifold gaskets, etc.

BACKGROUND ART

Only hydrogenated NBR having an iodine number of 28 or less has been so far used for fear of heat resistance problem, etc., where the heat resistance can be indeed improved, but it cannot be disregard that there is still a possibility to deteriorate the low temperature characteristics (as evaluated in terms of compression set value at low temperatures such as −30° C.). As a result, the molded products will suffer from occurrence of permanent set, when exposed to low-temperature using circumstances and oil leakage therefrom will take place, especially in the case of a sealing materials, leading to undesirable failure in product performance.

Patent Literature 1: JP-A-2001-288303

The present applicant has so far proposed a hydrogenated NBR composition capable of giving molding products, which satisfy both heat resistance and cold resistance at the same time, which comprises a hydrogenated NBR having an acrylonitrile content of 15-30% by weight, white carbon having a specific surface area of 200 m$^2$/g or less, and an organic peroxide, and preferably further contains a polyfunctional unsaturated compound and/or carbon black. The proposed hydrogenated NBR composition could attain the expected results, but encountered such a new problem as swelling of the polymer due to the low acrylonitrile content in such use circumstances that the gaskets around engines were exposed to oils and fuel oils, resulting in use failure.

Patent Literature 2: JP-A-2000-212333

DISCLOSURE OF THE INVENTION

Problem to be Solved by the Invention

An object of the present invention is to provide a hydrogenated NBR composition capable of giving molding products having distinguished oil resistance and fuel oil resistance as well as distinguished heat resistance and cold resistance, and also capable of serving as suitable molding materials for intake manifold gaskets of automobile engines.

Means for Solving the Problem

The objects of the present invention can be attained by a hydrogenated NBR composition, which comprises 100 parts by weight of a hydrogenated NBR having an acrylonitrile content of 25-44% by weight and an iodine number of 32-65, or a blend of the hydrogenated NBRs themselves, 2-23 parts by weight of an ester-based plasticizer, and 0.5-10 parts by weight of an organic peroxide, and preferably further contains 0.5-10 parts by weight of a polyfunctional unsaturated compound.

EFFECTS OF THE INVENTION

The present hydrogenated NBR composition can give cross-linked products having a distinguished oil resistance (resistance to such oil as No. 3 oil and other general-purpose engine oil, etc.) and a distinguished fuel oil resistance (resistance to such fuel oil as fuel oil C, and other general-purpose gasoline, etc.) as well as distinguished heat resistance and cold resistance, and thus can serve as suitable molding materials for intake manifold gaskets of automobile engines or automobile sealing parts, particularly sealing parts around engines or transmission systems.

BEST MODES FOR CARRYING OUT THE INVENTION

Hydrogenated NBR for use in the present invention has an acrylonitrile (AN) content of 25-44% by weight, preferably 30-40% by weight, and an iodine number of 32-65, preferably 40-60. In case of a blend, a blend of the hydrogenated NBRs having such an AN content and an iodine number as prescribed above can be used. When the AN content is less than 25% by weight, the oil resistance and the fuel oil resistance will be deteriorated, and oil leakage from the cross-linked products will occur at elevated temperatures, whereas when the AN content is more than 44% by weight, the low-temperature characteristics will be deteriorated, and oil leakage will occur at low temperatures. When the iodine number is less than 32, the low-temperature characteristics will be likewise deteriorated, and oil leakage will occur at low temperatures, whereas when the iodine number is more than 65, the heat resistance will be deteriorated. Actually, commercially available products can be used, for example, Zetpole series products of Nippon Zeon Co., Ltd., such as 2030L (AN content: 36 wt. %, iodine number: 57=hydrogenation rate: about 80%), and blends of 2030L with Zetpole series 1020 (AN content: 44 wt. %, iodine number: 25), 2020 (AN content: 36 wt. %, iodine number: 28), 2020L (AN content: 36 wt. %, iodine number: 28), 3120 (AN content: 25 wt. %, iodine number: 31) or the like, each of which has a hydrogenation rate of about 90%.

Ester-based plasticizer for use in the present invention includes, for example, dibasic carboxylic acid esters such as dibutyl phthalate, di(2-ethylhexyl) phthalate, dioctyl phthalate, di(2-ethylhexyl) adipate, di(butoxyethoxyethyl) adipate, di(2-ethylhexyl) azelate, dibutyl sebacate, di(2-ethylhexyl) sebacate, etc.; phosphoric acid esters such as tri(2-ethylhexyl) phosphate, triphenyl phosphate, cresyldiphenyl phosphate, tricresyl phosphate, etc.; or the like. Actually, the commercially available products can be used as such, for example, products of ADEKA Co., Ltd. such as RS107, RS700, RS705, P200, etc.

The ester-based plasticizer can be used in a proportion of 2-23 parts by weight, preferably 7-17 parts by weight, on the basis of 100 parts by weight of the hydrogenated NBR or a blend thereof. In case of a proportion of less than 2 parts by weight, the oil resistance and the fuel oil resistance will be deteriorated, leading to oil leakage from the cross-linked products, whereas in a proportion of more than 23 parts by weight the heat resistance will be deteriorated, though the low-temperature characteristics, oil resistance, etc. can be improved.

Hydrogenated NBR mixed with the ester-based plasticizer can be cross-linked by an organic peroxide.

Organic peroxide for use in the present invention includes, for example, t-butyl peroxide, dicumyl peroxide, t-butyl cumyl peroxide, 1,1-di(t-butylperoxy)-3,3,5-trimethylcyclohexane, 2,5-dimethyl-2,5-di(t-butylperoxy)hexane, 2,5-dimethyl-2,5-di(t-butylperoxy)hexane-3,1,3-di(t-butylperoxyisopropyl)benzene, 2,5-dimethyl-2,5-di(benzoylperoxy)hexane, t-butylperoxy benzoate, t-butylperoxyisopropyl carbonate, n-butyl-4,4'-di(t-butylperoxy)valerate, etc., and can be used in a proportion of about 1 to about 10 parts by weight, preferably about 2 to about 8 parts by weight, on the basis of 100 parts by weight of hydrogenated NBR or a blend thereof. In case of a proportion of organic peroxide of less than about 1 part by weight, the resulting vulcanization products fail to have a satisfactory cross-linking density, whereas in a proportion of more than about 10 parts by weight foaming will occur, resulting in vulcanization molding failure, or even if the vulcanization molding is possible, the rubber elasticity or elongation will be lowered.

Besides the afore-mentioned essential components, the present composition can preferably further contain a polyfunctional unsaturated compound such as triallyl (iso)cyanurate, trimethylolpropane tri(meth)acrylate, triallyl trimellitate, etc. in a proportion of about 0.5 to about 10 parts by weight, preferably about 2 to about 8 parts by weight, on the basis of 100 parts by weight of hydrogenated NBR or a blend thereof. Addition of the polyfunctional unsaturated compound is effective for further improvement of heat resistance and compression set characteristics. In case of a proportion of more than about 10 parts by weight the rubber elasticity and elongation will be lowered.

The present composition can be used upon appropriate addition of various additives usually used in the rubber industry, for example, a reinforcing agent such as carbon black, white carbon, etc., a filler such as talc, clay, graphite, calcium silicate, etc., a processing aid such as stearic acid, palmitic acid, paraffin wax, etc., an acid acceptor such as zinc oxide, magnesium oxide, etc., an antioxidant, a plasticizer, etc.

Carbon black, when used alone, can be used in a proportion of about 20 to about 150 parts by weight, preferably about 40 to about 90 parts by weight, on the basis of 100 parts by weight of hydrogenated NBR or a blend thereof, where the carbon black of a single grade or in a mixture of a plurality of grades can be used. White carbon, when used alone, can be used in a proportion of about 20 to about 150 parts by weight, preferably about 30 to about 60 parts by weight, on the basis of 100 parts by weight of hydrogenated NBR or a blend thereof. Both carbon black and white carbon can be used at the same time, where each can be used in a proportion of about 10 to about 140 parts by weight on the basis of 100 parts by weight of hydrogenated NBR or a blend thereof, but both together must be used in a proportion of about 20 to about 150 parts by weight.

When white carbon is used alone or together with carbon black a silane coupling agent can be preferably used in a proportion of about 0.1 part by weight or more, preferably about 0.5 to about 3 parts by weight, on the basis of 100 parts by weight of hydrogenated NB or a blend thereof. Generally, any silane coupling agent can be used without limit, so long as it can be applied to rubber. Such a silane coupling agent includes, for example, vinyltrimethoxysilane, γ-glycidoxypropyltrimethoxysilane, γ-methacryloxypropyltrimethoxysilane, γ-aminopropyltrimethoxysilane, γ-mercaptopropyltrimethoxysilane, etc. Addition of the silane coupling agent can improve the heat resistance and cold resistance The present composition can be prepared by kneading through a kneading machine such as Intermix, a kneader, a Banbury mixer, etc. or open rolls and its vulcanization can be carried by heating generally at about 150° to about 200° C. for about 3 to about 60 minutes through an injection molding machine, a compression molding machine, a vulcanization press, etc. and, if necessary, secondary vulcanization can be carried out by heating at about 120° to about 200° C. for about 1 to about 24 hours.

EXAMPLES

The present invention will be described in detail below, referring to Examples.

Comparative Example 1

|  | Parts by weight |
|---|---|
| Hydrogenated NBR (Zetpole 2020, a product of Nippon Zeon Co., Ltd., AN content: 36 wt. %, iodine number: 28) | 100 |
| FEF carbon black | 32 |
| MT carbon black | 35 |
| Ester-based plasticizer (RS107, a product of ADEKA Co., Ltd., adipic acid ether ester) | 15 |
| Antioxidant (Anti CD, a product of Ouchi-Shinko Chemical Co., Ltd.) | 1.5 |
| Antioxidant (Anti MBZ, a product of Ouchi-Shinko Chemical Co., Ltd.) | 1.5 |
| Zinc white | 2 |
| Organic peroxide (Percumyl D, a product of NOF Corp.) | 6 |

The above-mentioned components were kneaded through a kneader and open rolls, and the resulting kneaded product was subjected to press vulcanization at 170° C. for 20 minutes and then to oven vulcanization (secondary vulcanization) at 160° C. for 3 hours. The resulting vulcanized sheets (150 mm×150 mm×2 mm) and P24 O-rings were subjected to determination of the following test items:

Normal state physical properties: according to JIS K6253 and JIS K6 251 corresponding to ASTM D412

Compression set: according to JIS K6262 corresponding to ASTM D 395

At high temperature (150° C. for 70 hours)

At low temperature (−30° C. for 22 hours; values at 30 minutes after release)

Low-temperature characteristics: according to ASTM D-1329 (TR-10 value)

Heat resistance: Change (rate) of normal state physical properties and volume after standing in an oven at 150° C. for 70 hours Oil resistance: Change (rate) of normal state physical properties and volume after dipping in No. 3 oil at 120° C. for 70 hours Fuel oil resistance: Change (rate) of normal state physical properties and volume after dipping in fuel oil C at 60° C. for 70 hours Product performance evaluation: Visual observation of presence of oil leakage at low temperature (−30° C.) and high temperature (120° C.)

Example 1

In Comparative Example 1, the same amount of Zetpole 2030L of the same company (AN content: 36 wt. %, iodine number: 57) was used as hydrogenated NBR.

Example 2

In Comparative Example 1, the same amount of a blend (AN content: 36 wt. %, iodine number: 34) of 80 wt. % of Zetpole 2020 and 20 wt. % of Zetpole 2030L was used as hydrogenated NBR.

Example 3

In Comparative Example 1, the same amount of a blend (AN content: 36 wt. %, iodine number: 40) of 60 wt. % of Zetpole 2020 and 40 wt. % of Zetpole 2030L was used as hydrogenated NBR.

Example 4

In Comparative Example 1, the same amount of a blend (AN content: 36 wt. %, iodine number: 48) of 30 wt. % of Zetpole 2020 and 70 wt. % of Zetpole 2030L was used as hydrogenated NBR.

Example 5

In Example 1, the amount of ester-based plasticizer was changed to 5 parts by weight

Example 6

In Example 1, the amount of ester-based plasticizer was changed to 10 parts by weight

Example 7

In Example 1, the amount of ester-based plasticizer was changed to 20 parts by weight

Example 8

In Example 1, the amount of FEF carbon black was changed to 15 parts by weight, and 25 parts by weight of white carbon (Nipsil E74P, a product of Toso-silica Co., Ltd.) and 2 parts by weight of a silane coupling agent (A172, a product of Nippon Unicar Co., Ltd.) were used.

Example 9

In Example 1, 43 parts by weight of white carbon (Nipsil E74P) and 2 parts by weight of a silane coupling agent (A172) were used in place of FEF carbon black.

Results of determination in the foregoing Comparative Example 1 and Examples are shown in the following Table 1.

TABLE 1

| Determination Item | Comp. Ex. 1 | 1 | 2 | 3 | 4 | 5 | 6 | 7 | 8 | 9 |
|---|---|---|---|---|---|---|---|---|---|---|
| [Normal state physical properties] | | | | | | | | | | |
| Hardness (Duro A) | 72 | 73 | 72 | 72 | 73 | 78 | 76 | 70 | 73 | 73 |
| Tensile strength (MPa) | 23.9 | 22.4 | 23.6 | 23.2 | 22.8 | 24.5 | 23.6 | 20.5 | 22.2 | 22.5 |
| Elongation (%) | 250 | 180 | 230 | 220 | 200 | 160 | 170 | 190 | 180 | 180 |
| [Compression set] | | | | | | | | | | |
| At high temp. (%) | 11 | 11 | 11 | 11 | 11 | 10 | 11 | 12 | 11 | 11 |
| At low temp. (%) | 46 | 34 | 43 | 40 | 37 | 32 | 33 | 35 | 33 | 33 |
| [Low-temp. characteristics] | | | | | | | | | | |
| TR-10 (° C.) | −33 | −36 | −34 | −35 | −36 | −28 | −32 | −38 | −36 | −36 |
| [Heat resistance] | | | | | | | | | | |
| Hardness change (point) | +5 | +8 | +5 | +6 | +7 | +4 | +6 | +11 | +8 | +8 |
| Tensile strength change rate (%) | +7 | +3 | +6 | +5 | +4 | +1 | +1 | +5 | +4 | +1 |
| Elongation change rate (%) | +1 | −1 | ±0 | ±0 | −1 | −2 | ±0 | −5 | −3 | −3 |
| [Oil resistance] | | | | | | | | | | |
| Hardness change (point) | −3 | −3 | −3 | −3 | −3 | −5 | −4 | −2 | −3 | −3 |
| Tensile strength change rate (%) | −6 | +1 | −5 | −3 | −2 | +1 | ±0 | +2 | ±0 | ±0 |
| Elongation change rate (%) | −12 | −3 | −10 | −8 | −5 | −5 | −4 | −2 | −5 | −5 |
| Volume change rate ΔV (%) | +5.6 | +4.8 | +5.2 | +5.2 | +5.1 | +17.2 | +10.5 | +2.2 | +4.3 | +4.0 |
| [Fuel oil resistance] | | | | | | | | | | |
| Hardness change (point) | −9 | −5 | −8 | −8 | −7 | −9 | −7 | −3 | −4 | −5 |
| Tensile strength change rate (%) | −53 | −54 | −52 | −55 | −52 | −50 | −53 | −57 | −50 | −48 |
| Elongation change (%) rate (%) | −45 | −40 | −43 | −43 | −41 | −43 | −41 | −38 | −38 | −38 |
| Volume change rate ΔV (%) | +46 | +42 | +45 | +45 | +43 | +54 | +47 | +35 | +40 | +38 |

TABLE 1-continued

| Determination Item | Comp. Ex. 1 | Example 1 | 2 | 3 | 4 | 5 | 6 | 7 | 8 | 9 |
|---|---|---|---|---|---|---|---|---|---|---|
| [Product performance evaluation] | | | | | | | | | | |
| Oil leakage at high-low temperatures | none | none | none | none | none | none | none | none | none | none |

Comparative Example 2

In Comparative Example 1, the same amount of Zetpole 2000 (AN content: 36 wt. %, iodine number: 4) of the same company was used as hydrogenated NBR.

Comparative Example 3

In Comparative Example 1, the same amount of Zetpole 2010 (AN content: 36 wt. %, iodine value: 11) of the same company was used as hydrogenated NBR.

Comparative Example 4

In Comparative Example 1, the same amount of Zetpole 1020 (AN content: 44 wt. %, iodine number: 25) of the same company was used as hydrogenated NBR.

Comparative Example 5

In Comparative Example 1, the same amount of Zetpole 3120 (AN content; 25 wt. %, iodine number; 31) of the same company was used as hydrogenated NBR.

Comparative Example 6

In Example 1, no ester-based plasticizer was used.

Comparative Example 7

In Example 1, the amount of ester-based plasticizer was changed to 25 parts by weight.

Results of determination obtained in the foregoing Comparative Examples 2-7 are shown in the following Table 2.

TABLE 2

| Determination item | Comp. Ex. 2 | 3 | 4 | 5 | 6 | 7 |
|---|---|---|---|---|---|---|
| [Normal state physical properties] | | | | | | |
| Hardness (Duro A) | 70 | 70 | 73 | 67 | 80 | 67 |
| Tensile strength (MPa) | 22.5 | 22.7 | 24.5 | 20.7 | 25.5 | 18.5 |
| Elongation (%) | 400 | 350 | 240 | 220 | 150 | 210 |
| [Compression set] | | | | | | |
| At high temp. (%) | 8 | 10 | 11 | 13 | 9 | 13 |
| At low temp. (%) | 72 | 66 | 64 | 51 | 31 | 36 |
| [Low-temp. characteristics] | | | | | | |
| TR-10 (° C.) | −28 | −29 | −29 | −39 | −24 | −40 |
| [Heat resistance] | | | | | | |
| Hardness change (point) | +6 | +5 | +9 | +5 | +2 | +16 |
| Tensile strength change rate (%) | +5 | +4 | +6 | +8 | ±0 | +14 |
| Elongation change rate (%) | −4 | −8 | −3 | +10 | −1 | −20 |
| [Oil resistance] | | | | | | |
| Hardness change (point) | −5 | −5 | ±0 | −10 | −6 | ±0 |
| Tensile strength change rate (%) | −7 | −3 | +6 | −10 | +1 | +3 |
| Elongation change rate (%) | −20 | −11 | ±0 | −14 | −6 | −1 |
| Volume change rate ΔV (%) | +6.3 | +6.3 | −2.0 | +13.9 | +21 | +0.4 |
| [Fuel oil resistance] | | | | | | |
| Hardness change (point) | −17 | −15 | −9 | −12 | −12 | −1 |
| Tensile strength change rate (%) | −45 | −47 | −45 | −66 | −45 | −60 |
| Elongation change rate (%) | −46 | −46 | −42 | −49 | −47 | −35 |
| Volume change rate ΔV (%) | +47 | +47 | +28 | +67 | +62 | +28 |

TABLE 2-continued

| | Comp. Ex. | | | | | |
|---|---|---|---|---|---|---|
| Determination item | 2 | 3 | 4 | 5 | 6 | 7 |
| [Product performance evaluation] | | | | | | |
| Oil leakage occurrence | At low temp. | At low temp. | At low temp. | At high temp. | At low temp. | At high temp. |

The invention claimed is:

1. A hydrogenated NBR composition, which comprises 100 parts by weight of a hydrogenated NBR having an acrylonitrile content of 25-44% by weight, and an iodine number of 40-65, or a blend of the hydrogenated NBRs having an acrylonitrile content of 25-44% by weight, and an iodine number of 40-65, 2-23 parts by weight of di(butoxyethoxyethyl) adipate plasticizer, and 0.5-10 parts by weight of an organic peroxide.

2. A hydrogenated NBR composition according to claim 1, which comprises 100 parts by weight of a hydrogenated NBR having an acrylonitrile content of 30-40% by weight and an iodine number of 40-65, or a blend of the hydrogenated NBRs having an acrylonitrile content of 30-40% by weight and an iodine number of 40-65, 7-17 parts be weight of an ester-based plasticizer, and 4-8 parts by weight of an organic peroxide.

3. A hydrogenated NBR composition according to claim 1, further comprising 0.5-10 parts by weight of a polyfunctional unsaturated compound.

4. A hydrogenated NBR composition according to claim 1, further comprising 20-150 parts by weight of carbon black, white carbon or a mixture thereof.

5. A hydrogenated NBR composition according to claim 3, further comprising 20-150 parts by weight of carbon black, white carbon or a mixture thereof.

6. A hydrogenated NBR composition according to claim 4, wherein a silane coupling agent is further contained with the white carbon.

7. A hydrogenated NBR composition according to claim 5, wherein a silane coupling agent is further contained with the white carbon.

8. A hydrogenated NBR composition according to claim 1, for use as molding materials for intake manifold gaskets of engines.

9. An intake manifold gasket obtained by cross-linking molding of a hydrogenated NBR composition according to claim 8.

10. A hydrogenated NBR composition according to claim 3, for use as molding materials for intake manifold gaskets of engines.

11. An intake manifold gasket obtained by cross-linking molding of a hydrogenated NBR composition according to claim 10.

12. A hydrogenated NBR composition according to claim 4, for use as molding materials for intake manifold gaskets of engines.

13. An intake manifold gasket obtained by cross-linking molding of a hydrogenated NBR composition according to claim 12.

14. A hydrogenated NBR composition according to claim 5, for use as molding materials for intake manifold gaskets of engines.

15. An intake manifold gasket obtained by cross-linking molding of a hydrogenated NBR composition according to claim 14.

* * * * *